United States Patent
Streit et al.

(10) Patent No.: US 6,946,287 B2
(45) Date of Patent: Sep. 20, 2005

(54) DEVICE FOR PROVIDING A HYBRIDIZATION CHAMBER, AND PROCESS UNIT AND SYSTEM FOR HYBRIDIZING NUCLEIC ACID SAMPLES, PROTEINS, AND TISSUE SECTIONS

(75) Inventors: Wolfgang Streit, Hallein (AT); Gyoergy Wenczel, Seekirchen (AT); Anton Mathes, Neukirchen (DE); Waltraud Lamprecht, Salzburg (AT)

(73) Assignee: Tecan Trading AG, Mannedorf (CH)

( * ) Notice: Subject to any disclaimer, the term of this patent is extended or adjusted under 35 U.S.C. 154(b) by 415 days.

(21) Appl. No.: 10/154,467

(22) Filed: May 22, 2002

(65) Prior Publication Data

US 2003/0013184 A1 Jan. 16, 2003

(30) Foreign Application Priority Data

May 25, 2001 (CH) ............... 0969/01
Apr. 22, 2002 (CH) ............... 0668/02

(51) Int. Cl.$^7$ ............................... C12M 1/34
(52) U.S. Cl. ............... 435/287.2; 435/286.7; 435/288.5; 435/293.1
(58) Field of Search ............... 422/58, 68.1, 99; 435/6, 286.5, 286.7, 287.2, 287.9, 288.3–288.5, 293.1

(56) References Cited

U.S. PATENT DOCUMENTS

| | | | | |
|---|---|---|---|---|
| 5,273,905 A | * | 12/1993 | Muller et al. ............... | 435/286.5 |
| 5,958,760 A | | 9/1999 | Freeman ............... | 435/286.5 |
| 6,238,910 B1 | | 5/2001 | Custance et al. ............... | 435/287.2 |
| 6,432,696 B2 | | 8/2002 | Custance et al. ............... | 435/287.2 |
| 2002/0192701 A1 | * | 12/2002 | Adey ............... | 435/6 |
| 2004/0037739 A1 | * | 2/2004 | McNeely et al. ............... | 422/58 |

FOREIGN PATENT DOCUMENTS

| | | |
|---|---|---|
| EP | 0 695 941 | 2/1996 |
| EP | 0 891 811 | 1/1999 |
| WO | WO 00/09650 | 2/2000 |
| WO | WO 00/54874 | 9/2000 |
| WO | WO 02/41994 | 5/2002 |

OTHER PUBLICATIONS

Olsson, Anders, "Valve–less Diffuser Micropumps", Trita–Ila, Institutionen For Elektrisk Matteknik Kungl. Tekniska Hogskolan, SE, Nr. 9803, 1998, pp. 12–15, 27, ISSN: 0281–2878.

* cited by examiner

Primary Examiner—William H. Beisner
(74) Attorney, Agent, or Firm—Notaro & Michalos P.C.

(57) ABSTRACT

A device (1) is disclosed for providing a hybridization chamber (2), for hybridizing nucleic acid samples, proteins, or tissue sections on a slide (3), which is implemented so that it is movable in relation to this slide (3) and includes an annular sealing surface (4) for sealing the hybridization chamber (2) by being applied to a surface (5) of this slide (3), lines (6) for supplying and/or removing media to and/or from the hybridization chamber (2), and a specimen supply line (7). The devices according to the invention include a media-separating agitation device (8) for moving liquids in relation to samples immobilized on the surface (5) of the slide (3). Furthermore, process units (18) for hybridizing nucleic acid samples, proteins, or tissue sections and corresponding automatable systems including such process units (18) are disclosed.

15 Claims, 6 Drawing Sheets

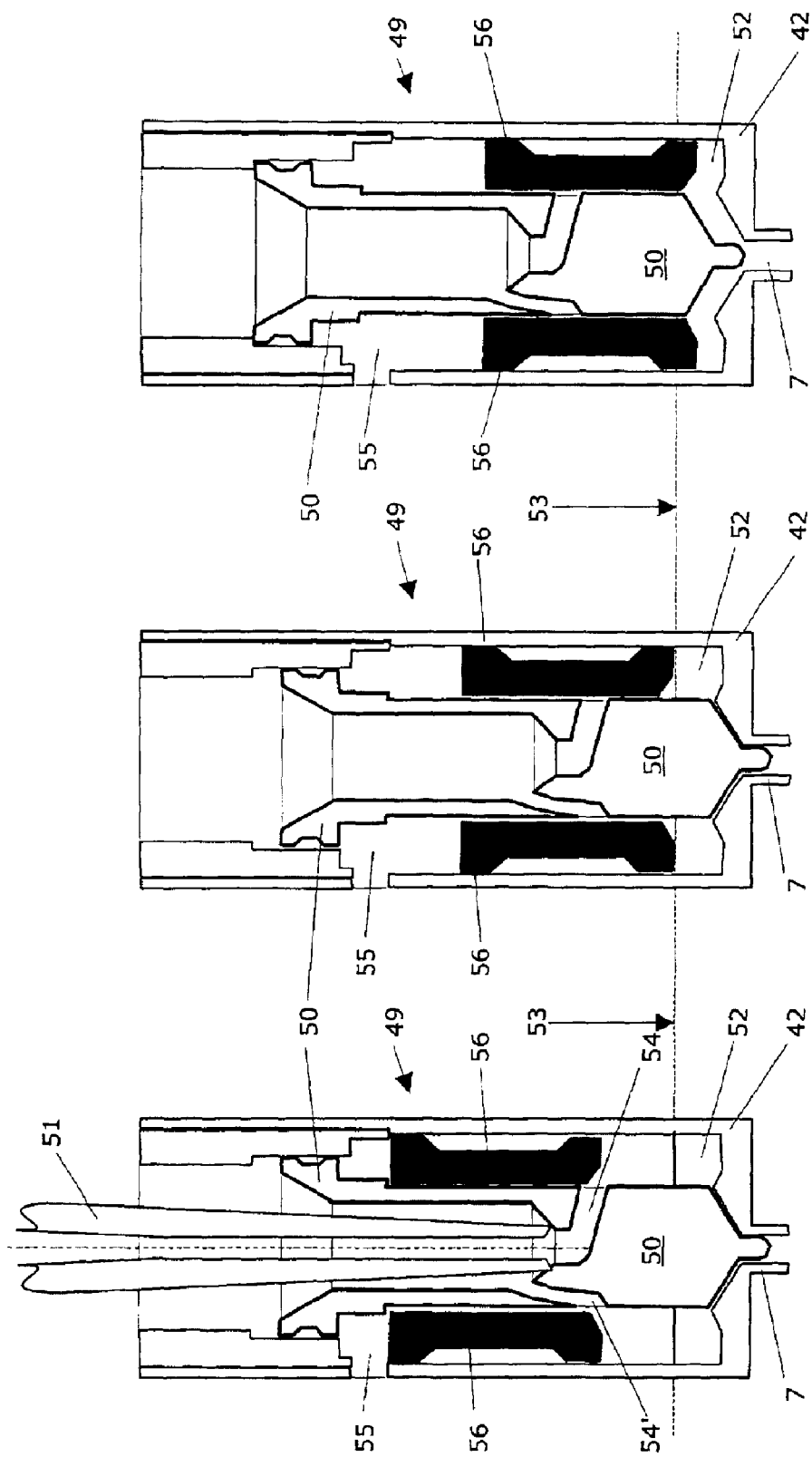

US 6,946,287 B2

DEVICE FOR PROVIDING A HYBRIDIZATION CHAMBER, AND PROCESS UNIT AND SYSTEM FOR HYBRIDIZING NUCLEIC ACID SAMPLES, PROTEINS, AND TISSUE SECTIONS

CROSS REFERENCES TO RELATED APPLICATIONS

This application claims priority from Swiss Patent Application No. 0969/01, filed May 25, 2001 and Swiss Patent Application No. CH-0668/02, filed Apr. 22, 2002.

FIELD OF THE INVENTION

The present invention relates to a device as well as a corresponding process unit and an automatic system for hybridizing nucleic acid samples, proteins, and tissue sections.

BACKGROUND OF THE INVENTION

The use of DNA samples (DNA=deoxyribonucleic acid), and particularly microarrays of such samples, provides an important technology in research for the simultaneous analysis of thousands of genes. This technology includes the immobilization of DNA samples from many genes on a fixed substrate surface, for example on a glass slide for a light microscope. The DNA samples are preferably arranged in an array of sample spots or "spots", i.e., in a two-dimensional grid on the substrate, and the origin of a corresponding DNA sample may be determined later based on the specific position within such an array. The technology typically includes contacting the DNA sample array with RNA specimen suspensions and/or solutions (RNA=ribonucleic acid) in order to thus determine specific nucleotide sequences in the DNA samples. In order to be able to differentiate between different RNA specimens, they are often provided with a "tag" or "label", i.e., a molecule which emits a fluorescent light having a specific wavelength corresponding to the respective special RNA specimen.

Under good experimental conditions, the RNA specimen hybridizes and/or binds to the immobilized DNA samples and forms hybrid DNA-RNA strands together with them. Differences in hybridization among the DNA samples may be determined for each of the immobilized DNA samples and for special RNA specimens by measuring the intensity and wavelength dependence of the fluorescence of each individual microarray element and it may thus be found out whether the degree of gene expression varies in the DNA samples investigated. Using DNA microarrays, statements may thus be made about the expression of great numbers of genes and about their expression pattern, although only small amounts of biological material have to be used.

DNA microarrays have established themselves as a successful tool and the devices for performing DNA hybridization have been improved continuously (cf., for example, U.S. Pat. No. 6,238,910). This document discloses a device to provide a hybridization chamber for hybridizing nucleic acid samples on a slide, which is implemented to be movable in relation to this slide and includes an annular seal for sealing the hybridization chamber by being applied to the surface of this slide. In addition, the device disclosed includes lines for supplying and/or removing media to and/or from the hybridization chamber, as well as a sample supply line. An improved temperature control and a movement of the liquid having the RNA specimens in relation to the DNA samples immobilized on the slide is also disclosed. However, it takes too long until an adequately good distribution of the specimen liquid in relation to the samples immobilized on the surface of the slide is achieved, and, in addition, the consumption of specimen liquid is considered to be too high.

SUMMARY OF THE INVENTION

The object of the present invention is therefore to suggest a device, using which the quantity of specimen liquid to be used is minimized and its distribution in relation to the samples immobilized on the substrate surface may be improved.

This object is achieved with the combination of features of the invention independent and is characterized in that the device has a media-separating agitation device for moving liquids in relation to the samples immobilized an the surface of the slide. Advantageous refinements and additional features also result from the present invention.

BRIEF DESCRIPTION OF THE DRAWINGS

The present invention will now be described in more detail with reference to schematic and exemplary drawings which are not to restrict the extent of the present invention.

FIG. 9A shows a specimen injection device according to a third embodiment having a two-part valve, during pipetting of the specimen liquid;

FIG. 9B shows a specimen injection device according to the third embodiment, during lowering of the first valve part;

FIG. 9C shows a specimen injection device according to the third embodiment, during raising of the second valve part.

DESCRIPTION OF THE PREFERRED EMBODIMENT

Figure 1:
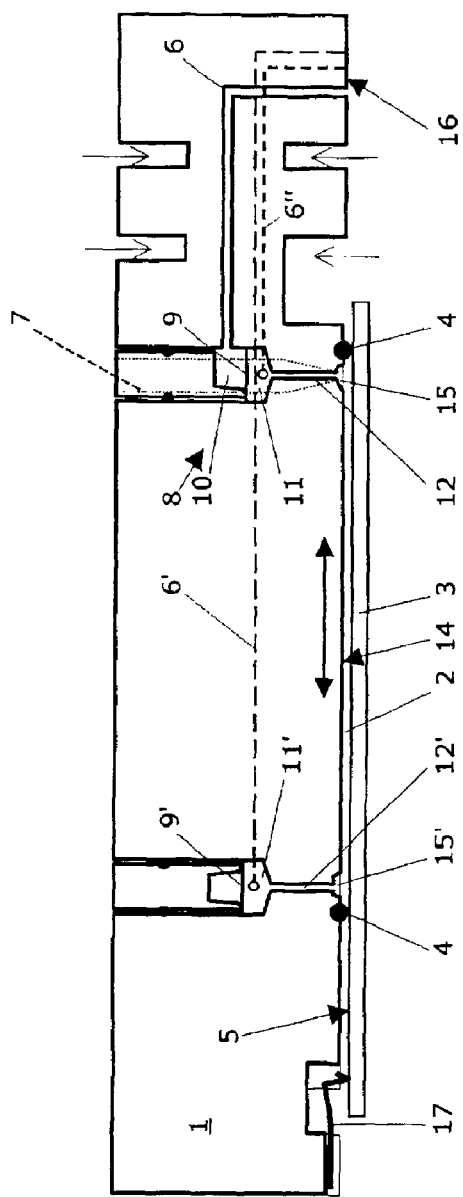
FIG. 1 shows a perpendicular longitudinal section through a device according to the present invention according to a first embodiment.

FIG. 1 shows a perpendicular longitudinal section through a device 1 according to the present invention according to a first embodiment. This device is used for providing a hybridization chamber 2 for hybridizing nucleic acid samples, proteins, or tissue sections on a slide 3. Device 1 is implemented so that it is movable in relation to this slide 3 (in this case, pivotable around an axis, cf. FIG. 7A), so that hybridization chamber 2 may be opened and closed by the simplest possible movement. An annular sealing surface 4 is used for sealing hybridization chamber 2 by being applied to a surface 5 of this slide 3. This sealing surface 4 may be an offset surface of device 1 which lies flat on surface 5 of slide 3 (not shown). However, an annular seal is preferably used as sealing surface 4 (shown here as an O-ring and referred to the following as seal 4), or a lip seal may, for example, also be used as an alternative to this. The device includes lines 6 for supplying and/or removing media to and/or from hybridization chamber 2. Such media may be reagents for performing the hybridization reaction, such as washing liquids or buffer solutions, or also inert gases (such as nitrogen) for drying the hybridization products on the slides and/or for blowing out media lines 6',6". These supply and/or removal lines 6',6" for washing media preferably each discharge into an agitation chamber 11',11. In addition, the device includes a sealable specimen supply line 7, through which liquids containing RNA or other specimen liquids may be pipetted in by hand. Specimen supply line 7 is preferably sealed using a plastic plug (not shown). As an alternative to this, an automatic specimen supply line (cf. FIG. 8) may be provided. According to the present invention, device 1 includes a media-separating agitation device 8 for moving liquids in relation to the samples of nucleic acids, proteins, or tissue sections immobilized on surface 5 of slide 3.

In the first embodiment shown in FIG. 1, agitation device 8 of device 1 includes a membrane 9. This membrane 9 separates a pressure chamber 10, which is implemented so it is fillable via one of lines 6 with a pressure fluid, from an agitation chamber 11, which is connected via an agitation line 12 to hybridization chamber 2. After the device has achieved thermal equilibrium, a specific volume of RNA specimen liquid has been added, and the specimen supply line is sealed, air or another gas (or even a liquid) is added in pulses via lines 6 to pressure chamber 10 (excess pressure version) or suctioned therefrom (partial vacuum version), so that membrane 9 bends in the same rhythm and correspondingly shrinks and/or enlarges agitation chamber 11. In this way, the specimen liquid is moved toward one or the other end, where a transverse flow channel 15,15' is preferably located on surface 14 of device 1 directed toward the inside of hybridization chamber 2, in the same rhythm as the excess pressure and/or partial vacuum and relaxation in hybridization chamber 2. On one hand, these transverse flow channels make the transverse distribution of the RNA molecules contained in the specimen solution easier, which causes the specimen liquid and/or the wash liquids to be distributed homogeneously over entire surface 5 in hybridization chamber 2. On the other hand, transverse flow channels 15,15' may also be used as a reservoir, so that the oscillating movement of the specimen solution (solid double arrow) generated by agitation device 8, which is integrated in the device, does not lead to a part of hybridization chamber 2 unintentionally remaining dry. A second agitation chamber 11', which is also provided with a membrane 9', is preferably connected via a second agitation line 12' to hybridization chamber 2. If a pressure surge now presses first membrane 9 into first agitation chamber 11, this pulse is transmitted via first agitation line 12 to the specimen liquid in hybridization chamber 2. This liquid yields somewhat toward second agitation line 12' (and may even partially fill it) and elevates the pressure in second agitation chamber 11'. Because of this, second membrane 9' bends upward and is elastically stretched at the same time. As soon as the excess pressure in pressure chamber 10 is reduced, both membranes 9,9' spring back into their rest position and move the specimen liquid in hybridization chamber 2 in the opposite direction. Through this oscillating movement, a specimen liquid having a minimal volume may be distributed practically homogeneously in the hybridization chamber in less than one minute using device 1 according to the present invention.

Figure 2:
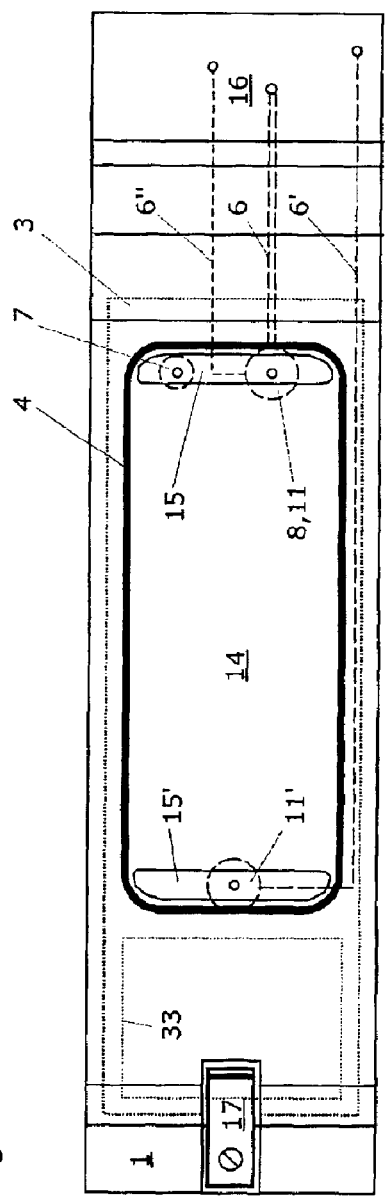
FIG. 2 shows a horizontal projection of the device from FIG. 1, seen from below.

FIG. 2 shows a horizontal projection of the device from FIG. 1, seen from below. O-ring seal 4 laterally delimits hybridization chamber 2, which has transverse flow channels 15,15', provided as depressions in surface 14 of device 1, on each of its opposing ends. Slide 3 (in this case a glass slide for light microscopy) and its optional grip and/or bar-code field 33 are drawn with dashes. A pressure spring 17 which presses on grip field 33 of slide 3 is also clearly visible. As an alternative to the embodiment shown, multiple pressure springs 17 may also be arranged on one device 1, these pressure springs 17 able to be distributed around the entire circumference of device 1. When hybridization chamber 2 is opened, such pressure springs 17 ease the automatic separation of slide 3 from device 1. The alignment of lines 6,6',6" and the arrangement of agitation chambers 11,11' and specimen supply line 7 are also visible. All agitation lines 12,12' and the specimen supply line discharge into transverse flow channels 15,15'. All lines 6,6',6" for supplying and/or removing media preferably discharge into a joint connection plane 16, which is arranged essentially parallel to hybridization chamber 2. In this case, the discharge openings may be arranged, as shown, offset to one another or on a line running transverse to device 1 (not shown). Recesses (blank arrows) reduce the heat flow to or from device 1.

Figure 3:
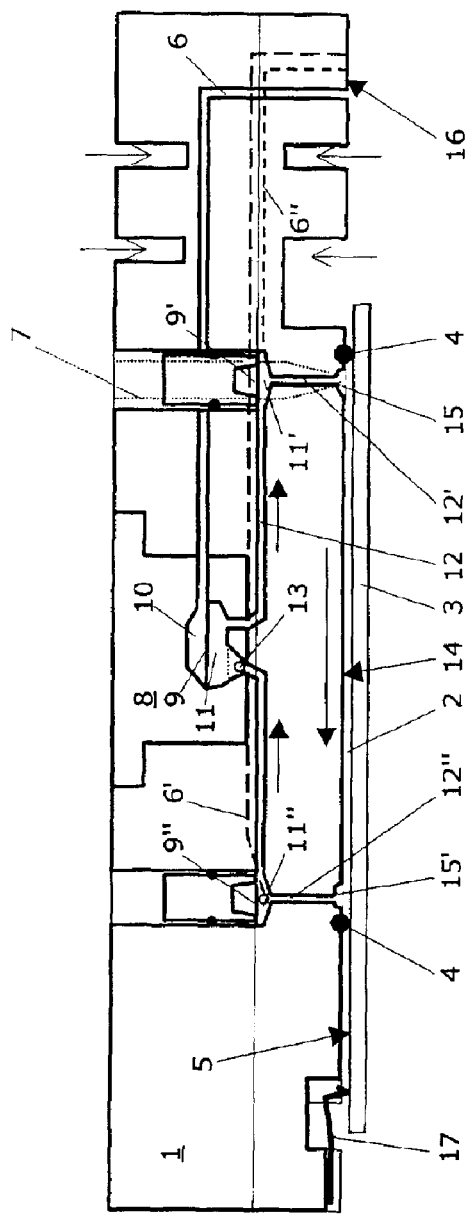
FIG. 3 shows a perpendicular longitudinal section through a device according to the present invention according to a second exemplary embodiment.

FIG. 3 shows a perpendicular longitudinal section through a device 1 according to the present invention according to a second embodiment. Agitation device 8 is implemented here as a membrane pump and includes flow-limiting means 13, which allow a preferred flow direction (filled arrows) of the liquids moved. Such flow-limiting means 13 may include return valves having balls (shown in FIG. 3), membranes, etc. and are known per se. A second and third agitation chamber 11',11", which are provided with membranes 9',9", are preferably connected via a second and/or third agitation line 12',12" to hybridization chamber 2. If a pressure surge now pushes first membrane 9 into first agitation chamber 11, this pulse (thanks to flow-limiting means 13) is only transmitted to the specimen liquid in hybridization chamber 2 via first and second agitation line 12,12'. This liquid yields somewhat toward third agitation line 12", fills it, and flows back into first agitation chamber 11 via third agitation chamber 11". Membranes 9',9" in agitation chambers 11',11" are somewhat deformed during each pressure surge and thus have a damping effect, so that particularly careful movement of the specimen liquid in hybridization chamber 2 results. As soon as the excess pressure in pressure chamber 10 abates, membrane 9 springs back into its rest position. This springing back is preferably supported by a partial vacuum which pulsates in diametrical opposition to the pressure surges and is applied to line 6. Through this flow movement in a closed loop, a specimen liquid having a slightly increased volume may be distributed practically homogeneously and particularly carefully in the hybridization chamber in less than a minute using device 1 according to the present invention.

Figure 4:
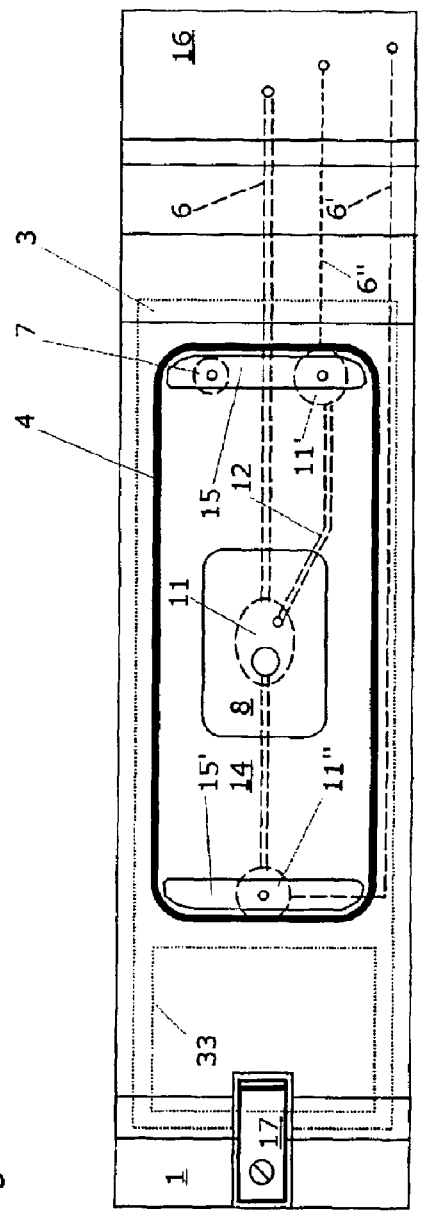
FIG. 4 shows a horizontal projection of the device from FIG. 3, seen from below.

FIG. 4 shows a horizontal projection of the device from FIG. 3, seen from below. O-ring seal 4 laterally delimits hybridization chamber 2, which has transverse flow channels 15,15', which are provided as depressions in surface 14 of device 1, on each of its opposing ends. Slide 3 (in this case a glass slide for light microscopy) and its grip field 33 are drawn with dashes. Pressure spring 17, which presses on grip field 33 of slide 3, is also clearly visible. When hybridization chamber 2 is opened, this pressure spring 17 eases the automatic separation of slide 3 from device 1. The alignment of lines 6,6',6" and the arrangement of agitation chambers 11,11',11" and specimen supply line 7 are also visible. Agitation lines 12',12" and specimen supply line 7 discharge into transverse flow channels 15,15'. All lines 6,6',6" for supplying and/or removing media preferably discharge into a joint connection plane 16, which is arranged essentially parallel to hybridization chamber 2. In this case, the discharge openings may be arranged offset to one another, as shown, or on a line running transverse to device 1 (not shown). Recesses (blank arrows) reduce the heat flow to or from device 1.

Figure 5:
FIG. 5 shows a three-dimensional view of a frame for carrying four slides, with one slide inserted.

FIG. 5 shows a three-dimensional view of a frame 21 for carrying four slides 3, with one slide 3 inserted. Frame 21 includes lengthwise walls 24, transverse walls 25, and intermediate walls 26 running essentially parallel to transverse walls 25. These walls 24,25,26 enclose openings 27 which completely penetrate frame 21. At the same time, lengthwise walls 24 and/or transverse walls 25 and/or intermediate walls 26 have a shoulder 28 on which slide 3 may be at least partially laid. Frame 21 preferably has an external surface profile and stacking surface profile corresponding to a microplate and includes at least one spring element 29 and one stop 30 for each slide 3 to elastically hold slide 3 inserted into frame 21.

This frame 21 is a holding device for at least one carrier—particularly for an essentially plate-shaped slide 3—which includes materials such as glass, plastic, silicon, pyrolytic graphite, and/or metal. Frame 21 preferably has gripping surfaces on its external surface profile defined by lengthwise walls 24 and transverse walls 25 to be engaged by a robot, which may have a gripper of this robot applied to them. Frame 21 is therefore implemented as a slide adapter for microplate systems and has an external surface profile which essentially corresponds to the external surface profile of a microplate. Therefore, such a frame 21, which additionally has a corresponding stacking surface profile, may be used for placement in a microplate station of a sample analysis and/or sample processing and/or sample storage system. Slide 3, which is preferably inserted by hand into frame 21, has at least one spring element 29 applied to it, which is implemented to exercise an elastic force on this slide 3. This elastic force is essentially aligned in the direction parallel and/or perpendicular to surface 5 of slide 3 and presses this slide 3 against a stop 30. For simpler insertion and/or removal of slide 3, frame 21 has grip openings 31. Every slide 3 inserted is securely held in frame 21 and no longer has to be touched by hand during the entire further method, as is described in International Application CH02/00012, whose priority is based on this frame 21, to which reference is expressly made here, and which's entire disclosure is incorporated by reference as well as the disclosure of the Swiss Priority Applications CH 0969/01 and CH 0668/02. Frame 21 is preferably produced from plastic in one piece together with spring elements 29 and stops 30 in the injection molding method. DNA samples, preferably arranged in a two-dimensional grid and/or in an array, which are adsorbed on surface 5 of slide 3, are preferably immobilized on slide 3. An optional grip field 33, which is preferably marked, may be touched with the fingers. Very generally, such a field may be implemented as a grip and/or barcode field. If barcodes are used on slides 3, systems 38 are preferably used which include a barcode reading device. Such a barcode or grip field 33 may also be left out completely or reduced in size so that a larger surface 5 of slide 3 is available to receive the samples, such as nucleic acid samples (e.g., DNA microarrays), proteins, or tissue sections. In such cases, a device 1 is, of course, selected in which the hybridization chamber 2 defined by sealing surface and/or seal 4 is enlarged.

Figure 6A:
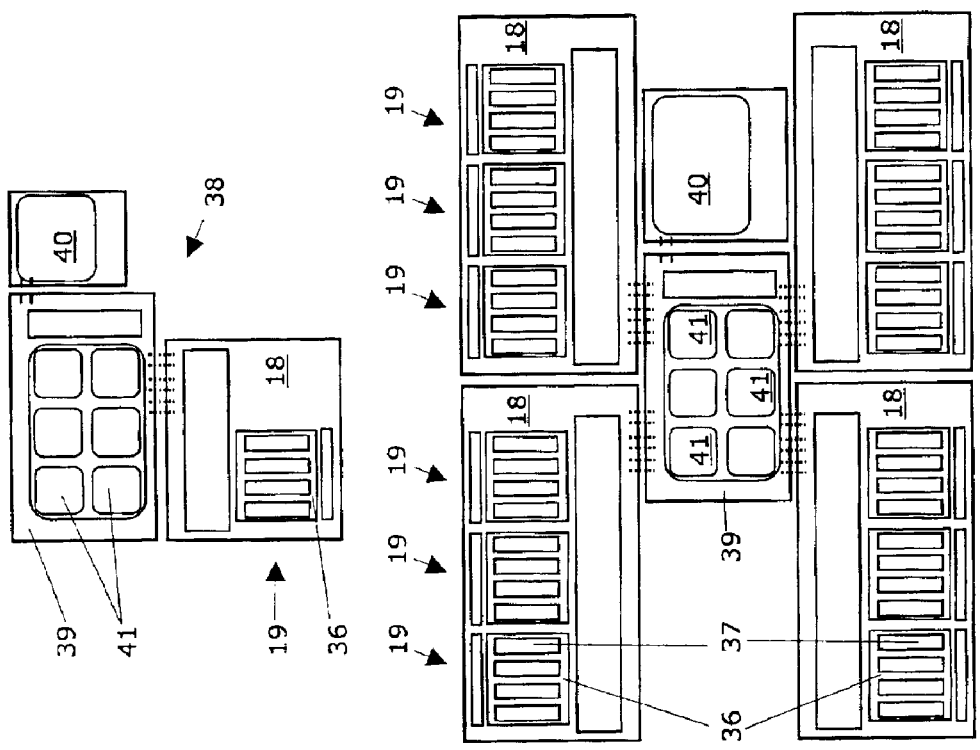
FIG. 6A shows a horizontal projection of a system having one small process unit.

FIG. 6A shows a horizontal projection of a small system 38 for hybridizing nucleic acid samples, proteins, or tissue sections having a small process unit 18. This process unit 18 includes at least one device 1, already described, for providing a hybridization chamber 2. Such a process unit 18 includes a baseplate 35 and preferably one holder 36 having four seats 37, which is pivotable around an axis and lockable in relation to a baseplate 35, per group of four 19, one device 1 being insertable in each of these seats 37. This insertion is preferably performed manually, the secure seating of device 1 in holder 36 being ensured by snap-in devices known per se (not shown). This system 38 additionally includes a central control device 39, a monitor 40, and a receptacle 41, which communicates with unit lines 23,23',23" and lines 6,6',6", for storing reagents and/or for collecting wastes. As indicated in FIG. 6A, all parts of the system are operatively connected to one another.

Figure 6B:
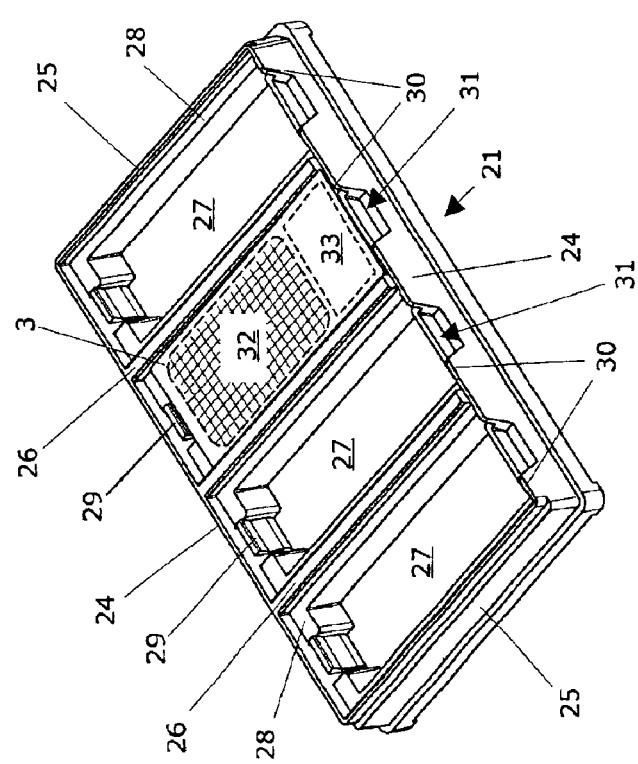
FIG. 6B shows a horizontal projection of a system having four large process units.

FIG. 6B shows a horizontal projection of a large system 38 for hybridizing DNA microarrays having four large process units 18. These process units 18 include at least one device 1, already described, for providing a hybridization chamber 2. Such a process unit 18 includes a baseplate 35 and preferably one holder 36 having four seats 37, which is pivotable around an axis and lockable in relation to a baseplate 35, per group of four 19, one device 1 being insertable in each of these seats 37. This insertion is preferably performed manually, the secure seating of device 1 in holder 36 being ensured by snap-in devices known per se (not shown). This system 38 additionally includes a central control device 39, a monitor 40, and a receptacle 41, which communicates with unit lines 23,23',23" and lines 6,6',6", for storing reagents and/or for collecting wastes. As indicated in FIG. 6B, all parts of the system are operatively connected to one another.

Functional units 18,39,40 indicated individually in FIG. 6 may alternatively—possibly together with further functional units, such as barcode readers, etc.—be combined and/or installed into a joint housing. At the same time, the number of process units 18 and/or groups of four 19 may be varied practically as desired. A part of these receptacles 41 (preferably four of six) are heated to protect the liquids contained therein from precipitation; a level control in these receptacles makes the automation of systems 38 easier. The processor in each central control device 39 preferably recognizes which process units 18 and/or groups of four 19 are active. The processor is preferably supplied with information which allows system 38 to establish and execute individual hybridization programs for each group of four 19. If barcode readers are used, central control device 39 and/or its processor is preferably made capable of detecting the position of each individual slide 3.

Figure 7A:
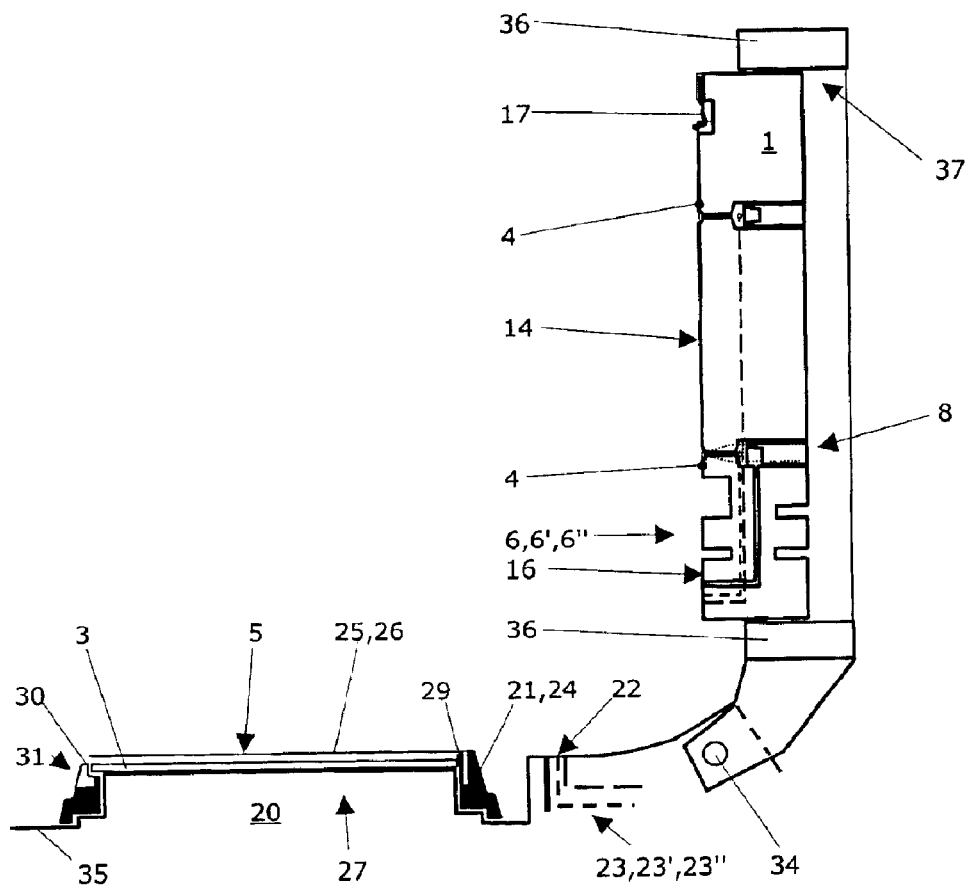
FIG. 7A shows a vertical section through a process unit having an open holder.

FIG. 7A shows a vertical section through a process unit 1 for hybridizing nucleic acid samples, proteins, or tissue sections with holder 36 open. Devices 1 are preferably arranged parallel to one another and in a group of four 19 (cf. FIG. 6), because this arrangement allows precisely a dimension for a temperature control plate 20 on which a frame 21 the size of a microplate (cf. FIG. 5) having four slides 3 arranged parallel to one another fits. Each of these groups of four 19 is assigned a temperature control plate 20 connected to a temperature control device. A temperature control plate 20 is implemented to receive a frame 21 carrying four slides 3 flat. Frame 21 includes, as described above, longitudinal walls 24, transverse walls 25, and intermediate walls 26 running essentially parallel to transverse walls 25. These walls enclose openings 27 which completely penetrate frame 21. Because longitudinal walls 24 and/or transverse walls 25 and/or intermediate walls 26 have a shoulder 28 on which slide 3 may be at least partially laid, a large area of slide 3 remains free, which may come into direct contact with the surface of temperature control plate 20. Because slide 3 is softly and elastically held in frame 21 and because temperature control plate 20 is implemented in such a way that the frame can be lowered somewhat in relation to it, slide 3 lies directly on the surface of temperature control plate 20. Each group of four 19 of a process unit 18 includes one holder 36 having four seats 37, which is pivotable around an axis 34 and lockable in relation to a baseplate 35, one device 1 being insertable in each of these seats 37. Each process unit 18 additionally includes a connection plate 22 for tightly connecting unit lines 23,23',23" to lines 6,6',6" of devices 1. O-rings are preferred as seals for these connections (not shown).

Figure 7B:
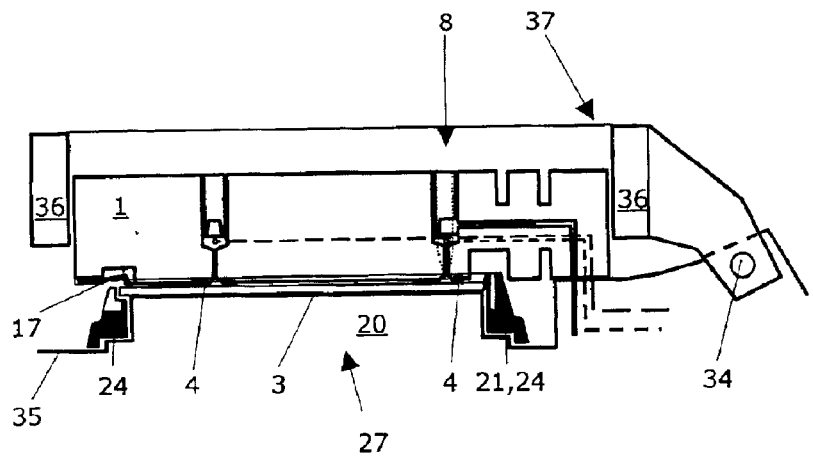
FIG. 7B shows a vertical section through a process unit having a closed holder.

FIG. 7B shows a vertical section through a process unit 1 for hybridizing nucleic acid samples, proteins, or tissue sections with holder 36 closed. All four hybridization chambers 2 of this group of four 19 are assigned a temperature control plate 20 connected to a temperature control device. A temperature control plate 20 is implemented to receive a frame 21 carrying four slides 3 flat, as described above. Each group of four 19 of a process unit 18 includes one holder 36 having four seats 37, which is pivotable around an axis 34 and lockable in relation to a baseplate 35, one device 1 being insertable in each of these seats 37. In order to ensure that devices 1 may be placed plane parallel to slides 3, the holder also has a central articulated joint (not shown) having movability parallel to axis 34. In order that seals 4 reliably seal hybridization chambers 2, an additional pressure is exercised on devices 1 via holder 36, which may be produced via screws, rocker arms, or similar known devices (not shown).

Each process unit 18 additionally includes a connection plate 22 for tightly connecting unit lines 23,23',23" to lines 6,6',6" of devices 1. O-rings are preferred as seals for these connections (not shown).

FIG. 8 shows specimen injection devices according to a first and/or a second embodiment. Such specimen injection devices are preferably provided in place of manual specimen supplies 7 in fully automated systems 38, in which the specimen injection is also to be performed automatically.

Figure 8A:
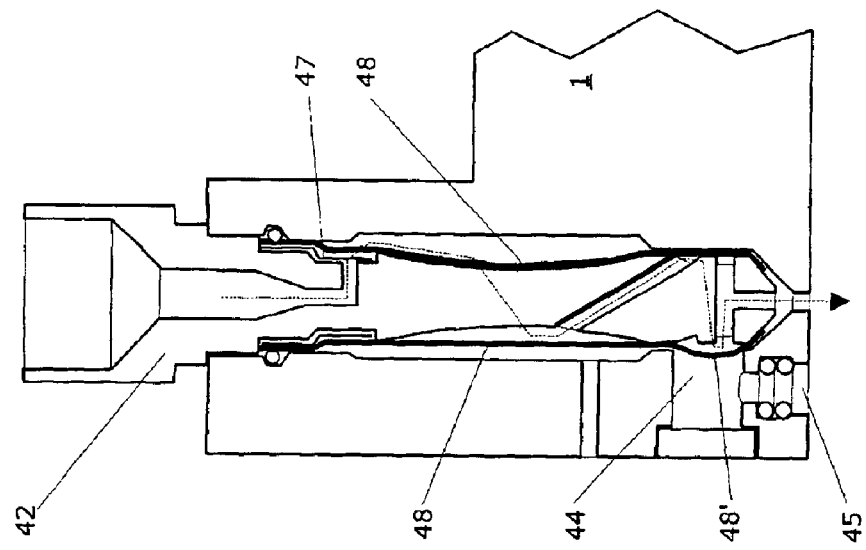
FIG. 8A shows a specimen injection device according to a first embodiment.

As shown in FIG. 8A, a corresponding device 1 includes a specimen injection device according to a first embodiment having a specimen receiving vessel 42, a floating ball 43, a sealing membrane 44, and a vacuum connection 45. A specific volume of a specimen solution is pipetted into specimen receiving vessel 42 without pressure and preferably using a pipettor (not shown), float ball 43 floats on the specimen solution in this case. The specimen solution is introduced into hybridization chambers 2 as soon as sealing membrane 44 is subjected to a partial vacuum via a vacuum connection 45: this sealing membrane 44 is elastically deformed in such a way that the specimen liquid flows around the transverse end (see arrow). Aeration of the vacuum connection immediately seals this specimen injection device. If essentially the entire volume of the specimen liquid pipetted into specimen receiving vessel 42 is introduced into hybridization chambers 2, floating ball 43 automatically seals the opening of the specimen injection device so that no air may reach hybridization chamber 2. A part 46 of specimen receiving vessel 42 is implemented as a valve seat, a soft plastic material being preferred for valve seat 42 or (preferably) for floating ball 43.

Figure 8B:
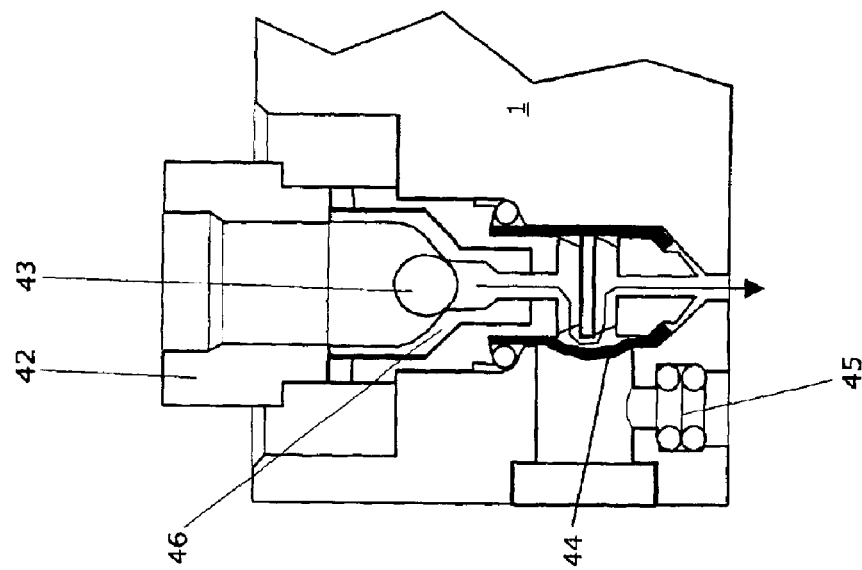
FIG. 8B shows a specimen injection device according to a second embodiment.

As shown in FIG. 8B, a corresponding device 1 includes a specimen injection device according to a second embodiment having a specimen receiving vessel 42, a sealing membrane 44, and a vacuum connection 45. A specific volume of a specimen solution is pipetted into specimen receiving vessel 42 with pressure and preferably using a pipettor (not shown). For this purpose, specimen receiving vessel 42 is designed in such a way that the inserted pipette tip of the pipettor presses tightly against the inner wall of specimen receiving vessel 42. The excess pressure generated using the pipettor allows a specific volume of specimen liquid to push into the space between second membrane 48 and constricted specimen receiving vessel 42 against the resistance of first membrane 47, which presses tightly. The specimen liquid is introduced into hybridization chamber 2 as soon as second membrane 48 is subjected to a partial vacuum via vacuum connection 45: this second membrane 48 is elastically deformed in such a way that the specimen liquid flows around the transverse end (see dashed arrow). Aeration of the vacuum connection immediately seals this specimen injection device. If essentially the entire volume of the specimen liquid pipetted into specimen receiving vessel 42 is introduced into hybridization chambers 2, first membrane 47 automatically seals the opening of the specimen injection device so that no air may reach hybridization chamber 2.

In the specimen injection devices shown in FIGS. 8A and 8B, a slight partial vacuum, which preferably exists for this purpose in hybridization chamber 2, makes filling hybridization chamber 2 with the specimen liquid easier.

FIG. 9 shows a specimen injection device according to a third embodiment having a two-part valve 49, during pipetting of the specimen liquid into specimen receiving vessel 42 (cf. FIG. 9A). A first part 50 of this two-part valve 49 is in its lowermost position and seals specimen supply line 7 of device 1. A preferably defined volume of the specimen liquid flows via pipette tip 51 into chamber 52 between specimen receiving vessel 42 and first valve part 50 via line 54, the surface of the liquid defining an appropriate level 53 and the excess air escaping via line 54'.

An excess pressure medium (e.g. nitrogen gas) is introduced into the space between first valve part 50 and annular second valve part 56 via connection 55, which causes second valve part 56, which has the excess pressure medium applied to it over a larger area, to yield downward (cf. FIG. 9B), until it touches the specimen liquid and is braked by it. At the same time, lines 54,54' are automatically closed. The excess pressure, which is still maintained, now causes second valve part 56 to move upward to its final position (cf. FIG. 9C), due to which specimen supply line 7 opens and the specimen liquid reaches the hybridization chamber. The excess pressure now further causes second valve part 56 to move all the way downward into its final position and therefore to press the specimen liquid out of chamber 52. The specimen liquid is therefore introduced into hybridization chamber 2 under pressure according to this embodiment of a specimen injection device and in contrast to the two embodiments previously described (cf. FIG. 8).

This third embodiment just described relates to a specimen injection device preferably conceived as disposable or expendable material, because then reproduction of its original state (cf. FIG. 9A) may be dispensed with. This is preferred above all if device 1 is also intended to be expendable or disposable material and therefore only to be used once.

In order that these procedures may run routinely and as reproducibly as possible, a system 38 includes a pipettor, using which specimen may be dispensed into specimen receiving vessels 42 of devices 1, and a vacuum device for generating a partial vacuum on sealing membrane 44. In this case, systems are preferred in which the pipettor and the vacuum device are controllable and/or regulatable via central control device 39. For better observability of the processes in hybridization chamber 2, device 1 is preferably produced from an at least partially transparent plastic. Specimens "labeled" with fluorescein are light-sensitive; a cover which is opaque to light is therefore preferably placed on each group of four 19 in order to prevent light reaching the specimens to which fluorescent materials have been added in hybridization chambers 2.

The reference numbers refer to identical features in each case, even if not all features are expressly mentioned for each figure.

What is claimed is:

1. A system with a plurality of process units for hybridization of nucleic acid, protein or tissue section samples, each process unit comprising:
   at least one device for preparation of a hybridization chamber on a surface of a specimen carrier, each device comprising a substantially rectangular body that is movable with respect to the specimen carrier, each rectangular body further comprising:
   an annular seal on a surface of the rectangular body that contacts the surface of the specimen carrier so as to form a sealed hybridization chamber;
   a plurality of lines in communication with the hybridization chamber remove for injecting media into the hybridization chamber or for removing media from the hybridization chamber;
   a specimen supply line in communication with the hybridization chamber; and
   an agitation device for moving liquids relative to samples immobilized on the surface of the specimen carrier, the agitation device comprising a chamber formed within the rectangular body, a membrane separating the chamber into a pressure chamber and an agitation chamber, wherein the pressure chamber is provided in fluid communication with a line for supplying a pressure fluid and the agitation chamber provides fluid communication between one of the plurality lines and the hybridization chamber through a separate agitation line;
   a common connection surface into which open the plurality of lines and the pressure fluid line, the lines being entirely open so that the media can always flow through the lines unhindered; and
   a temperature control plate connected to a temperature control device, the temperature control plate having a surface for coming into direct contact with the specimen carrier.

2. The system according to claim 1, wherein the entirely open lines (6, 6', 6") from the pressure chamber (10) and the agitation lines of the chambers (11, 11') of a device (1) open into the common connection surface (16).

3. The system (38) according to claim 2, including a connection plate (22) for a leak-tight connection of unit lines (23, 23', 23") to the lines (6, 6', 6") of the devices (1), the connection plate (22) being arranged substantially parallel to the hybridization chamber (2) and to the common connection surface (16).

4. The system (38) according to claim 1, including a frame (21) for supporting the specimen carrier (3) placed in the frame.

5. The system (38) according to claim 4, wherein the frame (21) comprises a specimen carrier adapter for microplate systems for accommodating plural specimen carriers (3) in the form of glass slides.

6. The system (38) according to claim 4, wherein the frame (21) has an external surface profile and stacking profile corresponding to a microplate and includes for each specimen carrier (3) at least one spring element (29) and one stop (30) to elastically hold the specimen carriers (3) inserted into the frame (21).

7. The system according to claim 1, wherein the device includes a second agitation chamber formed within the rectangular body, a membranes separating the second chamber into a pressure chamber and an agitation chamber, wherein the agitation chamber is provided in fluid communication with equipped the hybridization chamber through a second agitation line.

8. The system according to claim 1, wherein the agitation chamber includes two agitation lines provided in fluid communication with the hybridization chamber and one of the agitation lines includes a flow-restriction means to permit flow in a preferred direction of liquids moved.

9. The system according to claim 8, wherein the device includes second and third chambers formed within the rectangular body, each including a membrane separating the chamber into a pressure chamber and an agitation chamber and each provided in fluid communication with the hybridization chamber through an agitation and wherein one agitation line of the first agitation chamber is provided in fluid communication with the second agitation chamber and the other agitation line of the first agitation chamber is provided in fluid communication with the third agitation chamber.

10. The system according to claim 1, wherein the device includes transverse flow channels one in a region of each of opposite ends of the hybridization chamber in a surface facing an inside of the hybridization chamber and provided in communication with at least one of the plurality lines or agitation line.

11. The system according to claim 1, wherein each process unit (18) comprises a holder (36) which is pivotable around an axis (34) and lockable in relation to a base plate (35) and includes seats (37) and into each of which seals (37) a device (1) is inserted.

12. The system (38) according to claim 1, wherein at least one of the process units (18), a central control device (39), a monitor (40) end receptacles (41) communicating with unit lines (23, 23', 23") and the lines (6, 6', 6") are for storage of reagents or collection of waste.

13. The system (38) according to claim 1, includes at least one of the devices having a specimen receiving vessel provided in fluid communication with the specimen supply line, the vessel including a floating ball for sealing a bottom opening of the vessel, the supply line including a sealing membrane provided in fluid communication with a vacuum connection such that sample within the vessel is drawn into the bottom opening and into the hybridization chamber when the sealing membrane is subjected to a partial vacuum via the vacuum connection.

14. The system (38) according to claim 1, including at least one of the devices (1) being made from at least partially transparent plastic.

15. The system (38) according to claim 14, including at least one cover opaque to light and over one of the process units (18).

* * * * *